United States Patent
Kontkanen et al.

(10) Patent No.: US 11,033,040 B2
(45) Date of Patent: Jun. 15, 2021

(54) METHODS FOR PRODUCING DAIRY PRODUCTS

(71) Applicant: VALIO LTD, Helsinki (FI)

(72) Inventors: Hanna Kontkanen, Vantaa (FI); Saara Laiho, Helsinki (FI); Päivi Myllärinen, Helsinki (FI)

(73) Assignee: VALIO LTD., Helsinki (FI)

( * ) Notice: Subject to any disclaimer, the term of this patent is extended or adjusted under 35 U.S.C. 154(b) by 46 days.

(21) Appl. No.: 15/315,197

(22) PCT Filed: May 29, 2015

(86) PCT No.: PCT/FI2015/050377
§ 371 (c)(1),
(2) Date: Nov. 30, 2016

(87) PCT Pub. No.: WO2015/181451
PCT Pub. Date: Dec. 3, 2015

(65) Prior Publication Data
US 2017/0202232 A1    Jul. 20, 2017

(30) Foreign Application Priority Data

May 30, 2014 (FI) ..................................... 20145500

(51) Int. Cl.
| A23C 21/02 | (2006.01) |
| A23C 9/12 | (2006.01) |
| A23C 9/13 | (2006.01) |
| A23C 9/142 | (2006.01) |
| A23P 30/40 | (2016.01) |

(52) U.S. Cl.
CPC ............ *A23C 21/02* (2013.01); *A23C 9/1216* (2013.01); *A23C 9/1307* (2013.01); *A23C 9/1422* (2013.01); *A23P 30/40* (2016.08)

(58) Field of Classification Search
CPC ..... A23C 21/02; A23C 9/1216; A23C 9/1307; A23C 9/1422; A23P 30/40
USPC ...... 426/34, 41, 42, 564, 580, 583, 490, 491
See application file for complete search history.

(56) References Cited

U.S. PATENT DOCUMENTS

| 6,551,636 B2 | 4/2003 | Chen |
| 2010/0028525 A1 | 2/2010 | Lucey et al. |
| 2012/0263852 A1 | 10/2012 | Thiessen-Bolder et al. |

FOREIGN PATENT DOCUMENTS

| CN | 1543507 | 11/2004 |
| EP | 0 966 887 | 12/1999 |
| EP | 1 613 172 | 6/2007 |
| EP | 2 011 402 | 1/2009 |
| EP | 2 309 868 | 4/2011 |
| WO | WO 03/039264 | 5/2003 |
| WO | WO 2008/136671 | 11/2008 |
| WO | WO 2010/005830 | 1/2010 |
| WO | WO 2010/128207 | 11/2010 |

OTHER PUBLICATIONS

International Search Report for PCT/FI2015/050377, dated Aug. 19, 2015, 4 pages.
Written Opinion of the ISA for PCT/FI2015/050377, dated Aug. 19, 2015, 5 pages.
Search Report for FI 20145500, dated Nov. 21, 2014, 2 pages.
Yolato, Nutrition, Yogurt Benefits. Nutritional Information, & Yolato Soft Serve Frozen Yogurt nutrition information, Jun. 2, 2012, retrieved Nov. 13, 2014.
Office Action issued in CN Appln. No. 201580041055.X dated Jul. 24, 2019 (w/ translation).

*Primary Examiner* — Leslie A Wong
(74) *Attorney, Agent, or Firm* — Nixon & Vanderhye P.C.

(57) ABSTRACT

The present invention relates to a method of producing a protein containing dairy mousse, such as a quark mousse or a yogurt mousse. In particular, the present invention relates to a method of producing whipped dairy products involving the use of an ideal whey protein solution and protein modifying enzyme in the production of dairy mousses. The invention enables the production of dairy whipped products with relatively high protein content simultaneously with relatively low carbohydrate and fat contents in which the bubbles improve the mouth feel and rheological performance of the product.

7 Claims, 3 Drawing Sheets

METHODS FOR PRODUCING DAIRY PRODUCTS

This application is the U.S. national phase of International Application No. PCT/FI2015/050377 filed 29 May 2015, which designated the U.S. and claims priority to FI Patent Application No. 20145500 filed 30 May 2014, the entire contents of each of which are hereby incorporated by reference.

FIELD OF THE INVENTION

The present invention relates to a method of producing a protein containing dairy mousse, such as a quark mousse or a yogurt mousse. In particular, the present invention relates to a method of producing whipped dairy products involving the use of an ideal whey protein solution and protein modifying enzyme in the production of dairy mousses. The invention enables the production of totally new dairy whipped products with relatively high protein content simultaneously with relatively low carbohydrate and fat contents in which the bubbles improve the mouth feel and rheological performance of the product.

BACKGROUND OF THE INVENTION

Dairy mousse products are currently known in the market all over the world. However, those products typically have low amount of protein (about 3-5.5 g/100 g of product). Some high-protein products (>10 g/100 g) are available, but those products, however, also contain high amount of carbohydrates (>20 g/100 g). Thus, there is still a need for novel protein-rich mousse product with low amount of carbohydrates and with excellent texture. The present invention meets this need. The use of ideal whey protein solution together with protein modifying enzyme enables these needs.

BRIEF DESCRIPTION OF THE INVENTION

An object of the present invention is to provide a method for preparing a dairy mousse comprising the steps of:
providing an ideal whey protein solution,
treating the ideal whey protein solution with a protein modifying enzyme,
optionally mixing the treated solution with an acidified dairy product and/or a food product,
adjusting the pH to 3.5-6.5,
heat-treating the solution or the mixture,
subjecting the solution or the mixture to an aeration treatment for providing an aerated dairy product.

Another object of the present invention is to provide a dairy mousse containing about 2-20 w-% protein, about 3-20 w-% carbohydrates, about 0-8 w-% fat and about 20-232 kcal energy/100 g, and having casein:whey protein ratio between 20:80-65:35, pH in the range of 3.5-6.5 and an overrun of about 20-400%.

A further object of the invention relates to the use of an ideal whey protein solution and/or protein modifying enzyme in the production of a dairy mousse.

The objects of the invention are achieved by methods/products and uses characterized by what is stated in the independent claims. The preferred embodiments of the invention are disclosed in the dependent claims.

DETAILED DESCRIPTION OF THE INVENTION

Figure 1:
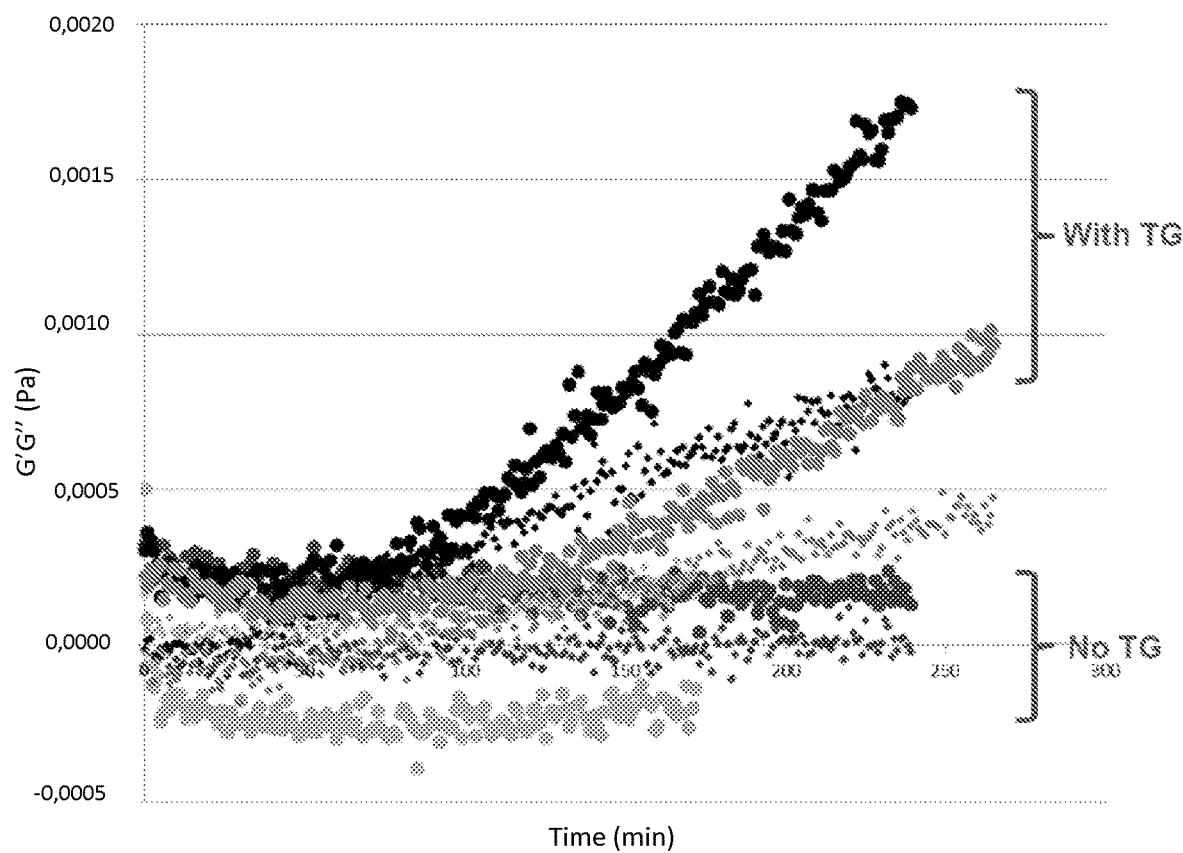
FIG. 1 shows the interfacial shear rheology of whey protein solution with or without pre-treatment with TG (0.001% in NaP-buffer). Smaller labels are for G".

The present invention is based on the finding that an ideal whey protein preparation can be used together with a protein modifying enzyme in the production of a whip or a mousse.

In the present invention, the ideal whey protein solution is obtained as a microfiltration permeate of a milk raw material. The microfiltration permeate contains the whey proteins in their native form (i.e., ideal whey proteins). The microfiltration permeate can be further treated and/or concentrated by membrane filtration (ultrafiltration, reverse osmose, nanofiltration) and/or evaporation, for example. The term "an ideal whey protein solution" refers to a microfiltration (MF) permeate obtained from microfiltration of a milk raw material. The term "an ideal whey protein solution" is understood to encompass also a concentrated form of the MF permeate which is obtained, for example, as an ultrafiltration retentate from ultrafiltration of the MF permeate.

Accordingly, the ideal whey protein solution can be produced by a method which comprises the steps of:
subjecting a milk raw material to microfiltration to separate the ideal whey proteins as a microfiltration permeate and a casein concentrate as a microfiltration retentate,
optionally subjecting at least a portion of the microfiltration permeate to ultrafiltration to provide an ultrafiltration permeate and an ideal whey protein concentrate as an ultrafiltration retentate,
optionally evaporating at least a portion of the microfiltration permeate and/or the ultrafiltration retentate,
optionally drying at least a portion of the microfiltration permeate and/or the ultrafiltration retentate, and/or the evaporate,
providing the microfiltration permeate or the ultrafiltration retentate of the microfiltration permeate or the evaporated microfiltration permeate or the evaporated ultrafiltration retentate of the microfiltration permeate or the dried microfiltration permeate or the dried ultrafiltration retentate of the microfiltration permeate as the ideal whey protein preparation.

Thus, in the present invention, the ideal whey protein preparation can be in the form of a solution or in the form of an evaporate (concentrate) or in the form of a powder.

The milk raw material may be, for instance, full-fat milk, cream, low-fat milk or skim milk, lactose-free or low-lactose milk, protease treated milk, recombined milk from milk powder, organic milk or a combination of these, or a dilution of any of these. Milk can originate from a cow, sheep, goat, camel, horse or any other animal producing milk suitable for nourishment. In one embodiment, the milk raw material is skimmed milk. In another embodiment, the milk raw material is low lactose or lactose-free milk. In a further embodiment, the milk raw material is low lactose or lactose-free skimmed milk.

In one embodiment, the ideal whey protein solution can be prepared by microfiltrating skimmed milk and concentrating the obtained microfiltration permeate by ultrafiltration. Microfiltration of the skimmed milk is typically carried out at a temperature of about 2° C. to about 55° C. In one embodiment, the microfiltration is carried out at about 10°

C. Ultrafiltration is typically performed at about 5° C. to about 55° C. In one embodiment, the ultrafiltration is carried at about 10° C.

The ideal whey protein solution contains β-casein, about 20% of the total protein, but it does not contain micellar casein monomers or any other by-products from the cheese manufacture, i.e., it is free of caseinomacropeptides and thermally formed k-casein β-lactoglobulin complexes. The pH of the idea whey protein solution is in the range of 6.5-7, typically about 6.7.

The protein content of the ideal whey protein solution and/or preparation can range from about 4% to about 90%. In an embodiment, the protein content of the solution and/or preparation is about 9% and β-casein content is about 20% based on total protein. In another embodiment, the protein content of the preparation is about 16% and β-casein content is about 20% based on total protein. The ideal whey protein solution and/or preparation contains more α-lactalbumin and β-lactoglobulins in total whey protein than whey protein concentrate (WPC) manufactured from cheese whey because the caseinoma-cropeptide fraction does not exist in the ideal whey protein solution and/or preparation. The lactose content of the ideal whey protein solution and/or preparation can be reduced, if desired. The lactose removal can be accomplished with methods known in the art, for example. In one embodiment, the ideal whey protein preparation is in the form of an ideal whey protein solution, which contains about 7% whey protein, about 1.8% casein, about 2.3% lactose, about 0.47% ash, and the dry matter of the solution being about 12.2%. In another embodiment, the ideal whey protein preparation is in the form of an ideal whey protein powder which contains about 88% whey protein, about 0% casein, about 0% lactose, about 3% ash, and the dry matter of the solution being about 90%. Accordingly, the ideal whey protein preparation can be used in the method of the present invention in a liquid form as a solution or in dried form as a powder. Functional properties of whey proteins are better maintained when the drying step does not exist in the manufacturing process of ideal whey protein preparation. The taste of the ideal whey protein preparation is pleasant and clean due to the mild heat-treatment performed at temperature below 75° C., most typically at 72° C. for 15 seconds. Additionally, ideal whey protein preparation does not carry any of the associated off-flavors because it is not derived from cheese production.

The present invention thus relates to a method for preparing a dairy mousse from an ideal whey protein preparation by treating it with a protein modifying enzyme and subjecting the treated preparation to an aeration treatment for providing an aerated dairy product. In one embodiment, a stabilizing agent is also added to the process.

In one embodiment, the present invention provides a method for preparing a dairy mousse starting from an ideal whey protein preparation in a liquid form comprising the steps of:
  providing an ideal whey protein solution,
  treating the ideal whey protein solution with a protein modifying enzyme,
  optionally mixing the treated solution with an acidified dairy product and/or a food product,
  optionally adding a stabilizing agent to the solution or the mixture,
  adjusting the pH to 3.5-6.5,
  heat-treating the solution or the mixture,
  subjecting the solution or the mixture to an aeration treatment for providing an aerated dairy product.

In one embodiment, the present invention provides a method for preparing a dairy mousse starting from an ideal whey protein preparation in a powder form. In this embodiment, the method may comprise additional steps of:
  providing an ideal whey protein preparation in a powder form,
  providing an ideal whey protein solution prepared from the ideal whey protein powder.

Accordingly, the method for preparing a dairy mousse comprising the steps of:
  providing an ideal whey protein preparation in a powder form,
  providing an ideal whey protein solution prepared from the ideal whey protein powder,
  treating the ideal whey protein solution with a protein modifying enzyme,
  optionally mixing the treated solution with an acidified dairy product and/or a food product,
  optionally adding a stabilizing agent to the solution or the mixture,
  adjusting the pH to 3.5-6.5,
  heat-treating the solution or the mixture,
  subjecting the solution or the mixture to an aeration treatment for providing an aerated dairy product.

Alternatively, when starting with an ideal whey protein preparation in a powder form, the method may comprise additional steps of:
  providing an ideal whey protein preparation in a powder form,
  mixing the powder with an stabilizing agent.

In this embodiment the method for preparing a dairy mousse comprising the steps of:
  providing an ideal whey protein preparation in a powder form,
  mixing the powder with an stabilizing agent,
  treating the mixture of the ideal whey protein and the stabilizing agent with a protein modifying enzyme,
  optionally mixing the treated solution/mixture with an acidified dairy product,
  adjusting the pH to 3.5-6.5,
  heat-treating the mixture,
  subjecting the mixture to an aeration treatment for providing an aerated dairy product.

The method of the present invention may also comprise a step of adding a stabilizing agent to ideal whey protein preparation.

In a certain embodiment, the method of the present invention contains a step of adding a stabilizing agent to the mixture. Accordingly, in this embodiment the method of the present invention comprises the steps of:
  providing an ideal whey protein solution,
  treating the ideal whey protein solution with a protein modifying enzyme,
  optionally mixing the treated whey solution with acidified dairy product and/or a food product,
  adding a stabilizing agent to the solution or the mixture,
  adjusting the pH to 3.5-6.5,
  heat-treating the solution or the mixture,
  subjecting the solution or the mixture to an aeration treatment for providing an aerated dairy product.

In the present invention, the stabilizing agent contains hydrocolloids retaining continuous phase and surface-active agents acting as emulsifiers. The hydrocolloid can be selected from gelatin, starch, starch hydrolysates, xanthan gum, gum arabic, guar gum, gellan gum, acacia, agar agar, alginates konjac, mannan, pullulan, carob, beta glucan, carrageen, polydextrose, cellulose and/or cellulose derivatives. The emulsifier can be selected from various phosphates and lecithin, for example. In one embodiment the stabilizing agent is a mixture of gelatin, starch, guar gum and diphosphate (QGR). The amount of the stabilizing agent added to the process depends on the hydrocolloid(s) and emulsifier(s) used in the stabilizing agent and the characteristics and/or amounts of the components of the dairy mousse.

The method of the present invention optionally comprises also the step of:
heat-treating the ideal whey protein solution before the protein modifying enzyme treatment step,
cooling the heat-treated solution or the mixture for providing a cooled solution or mixture for the aeration step,
packing the aerated product,
storing the product.

Accordingly, in a certain embodiment the method of the present invention comprises the steps of:
providing an ideal whey protein solution,
optionally heat-treating the ideal whey protein solution,
treating the ideal whey protein solution with a protein modifying enzyme,
optionally mixing the treated solution with an acidified dairy product and/or a food product,
adding a stabilizing agent to the solution or the mixture,
adjusting the pH to 3.5-6.5,
heat-treating the solution or the mixture,
optionally cooling the heat-treated solution or the mixture to provide a cooled solution or mixture,
subjecting the solution or the mixture to an aeration treatment for providing an aerated dairy product.
optionally packing the aerated product,
optionally storing the product.

In the present invention, the heat treatment of the solution or the mixture is done using any method known by the person skilled in the art, such as pasteurization, high-pasteurization, thermization or UHT-treatment. It is important that in addition to the microbiological point of view, the heat treatment is efficient also in denaturation of a right amount of whey proteins (about 75-95%) and thus, in the enhancement of the foaming properties of whey proteins. In one embodiment, the heat-treating of the solution or the mixture denatures at least about 75% of the whey proteins. In one embodiment, the heat-treating of the solution or the mixture denatures about 75-95% of the whey proteins. In one embodiment, the heat treatment is carried out at a temperature ranging from about 70° C. to about 95° C. In one embodiment, the heat treatment is carried out for about 1 to 15 minutes. The heat treatment is typically carried out at a temperature ranging from about 70° C. to about 95° C. for about 1 to about 15 minutes. In one embodiment, the heat treatment is carried out at about 70° C. to about 95° C. for about 1-5 minutes. In one embodiment, the heat treatment is carried out at about 70° C. to about 95° C. for about 5 to about 15 minutes. In one embodiment, the heat treatment is carried out at about 78-82° C. for about 1-5 minutes. In a certain embodiment, the heat treatment is carried out at about 82° C. for about 2 minutes. In a certain embodiment, the heat treatment is carried out at about 78° C. for about 2 minutes.

In the step of treating the ideal whey protein solution with a protein modifying enzyme, the ideal whey protein solution is modified with a protein glutaminase and/or a transglutaminase. In one embodiment, the crosslinking enzyme is a transglutaminase (EC 2.3.2.13). Transglutaminase can be any transglutaminase commonly used in dairy industry. It can be derived from a microbial source, fungus, mould, fish and a mammal. In an embodiment of the invention, transglutaminase is isolated from a microbial source. There are several commercially available transglutaminase enzyme preparations that are suitable for use in the process of the invention. These include Activa®YG (Ajinomoto, Japan), Activa®MP (Ajinomoto, Japan), and Yiming-TG (Yiming Fine Chemicals Co., Ltd., China). Optimum conditions depend on the enzyme used and they can be obtained from the manufacturers of the commercial enzymes. In one embodiment, the protein modifying enzyme is a protein glutaminase. Protein glutaminase (PG) catalyzes the deamidation of protein bound glutamine, and glutamine is converted to glutamic acid. Protein glutaminase preparations suitable for use in the process of the invention are available. Optimum conditions depend on the enzyme used and they can be obtained from the manufacturers of the enzymes. In a further embodiment, the ideal whey protein solution is modified with a transglutaminase and a protein glutaminase. The amounts of a transglutaminase and/or protein glutaminase used or needed in the process of the present invention depend also on the process conditions, such as timing and/or temperature, for example. In a certain embodiment, transglutaminase treatment is done for 18 hours at 5° C. In a certain embodiment, transglutaminase treatment is done for 2 hours at 20° C.

In the present invention, the acidified dairy product refers to yogurt and quark, sour milk, kefir, tvorog, skyr, greek yogurt, viili, smetana, cottage cheese and any mixture thereof. In the present invention, the food product refers to fruits and/or berries and juices, beverages, purees, jams and/or conserves thereof. The yogurt and/or quark suitable for the dairy mousse of the present invention can be unflavored or flavored with fruits, berries, jams and/or conserves. The yogurt and/or quark suitable for the dairy mousse of the present invention can be a low fat/fat free product or a full fat product. The yogurt and/or quark suitable for the dairy mousse of the present invention can be low lactose/lactose-free product or a lactose containing product. The yogurt and/or quark suitable for the dairy mousse of the present invention can be supplemented with probiotic bacteria. In view of the present invention, it is advantageous that tvorog, cottage cheese and quark are free of caseinomacropeptides. Thus, the dairy mousses of the present invention prepared from ideal whey protein preparation will reach better stability compared to foam prepared from cheese whey protein concentrate.

In the present invention, the aeration treatment is performed utilizing techniques and equipment known by the person skilled in the art to incorporate gas into the mix of the mass. Such techniques and equipments are used in manufacturing aerated products and ice cream, for example. Haas-Mondomix, a Dutch company, offers machinery for aerating dairy masses at a temperature at or above 4° C. The aeration of the product can be made by using a mechanical mixing treatment, i.e., by using a physical mixing treatment, such as HPP-(high pressure process) or ultrasound techniques. Thus, the aeration of the product can be made by whipping at from about 4° C. to about 5° C., with an ice cream freezer, or utilizing HPP (high pressure process) or ultrasound techniques. In one embodiment, the aeration treatment is performed by whipping. In a certain embodiment, the aeration treatment is performed by whipping at about 4° C. In one embodiment, the aeration treatment is performed by whipping at about 4° C., with an ice cream freezer, utilizing HPP-technique or utilizing ultrasound technique. Aeration can be achieved also by technology based on cavitation. In the aeration treatment step gas, such as air, $CO_2$, $N_2$, argon or any mixture thereof, is incorporated into the texture of the product in varying amounts. In embodiment, the gas is $N_2$. The amount of gas incorporated into the product is illustrated by overrun. The term "overrun" is defined to be the % increase in the volume of the product greater than the amount of the mixture used to produce the product.

Overrun can be calculated according to the equation:

volume of the aerated product−volume of the product before aeration×100 volume of the product before aeration In the method of the present invention, the overrun is at least 20%. In one embodiment, the overrun is at least 25%. In one embodiment the overrun is about 20-about 400%. In another embodiment, the overrun is about 20-about 300%. In a further embodiment, the overrun is about 20-about 120%. In a further embodiment the overrun is about 120 about 300%. In one embodiment, the overrun is at least 35%. In one embodiment, the overrun is about 35-about 400%. In another embodiment, the overrun is about 35-about 300%. In a further embodiment, the overrun is about 35-about 120%. In one embodiment, the overrun is at least 45%. In one embodiment, the overrun is about 45-about 400%. In another embodiment, the overrun is about 45-about 300%. In a further embodiment, the overrun is about 45-about 120%. In a further embodiment, the overrun is about 45-about 100%. In a certain embodiment, the overrun is about 55%-about 100%. In a further embodiment, the over-run is about 45-about 55%. In one embodiment, the overrun is about 100%. In one embodiment, the overrun is about 55%. In one embodiment, the overrun is about 45%. In one embodiment, the overrun is about 35%. In another embodiment, the overrun is at least 25%.

In the present invention, the aerated product is optionally packed. The packing is performed using methods known by the person skilled in the art.

In the present invention, the aerated and/or packed aerated product is optionally stored. The product could be stored in a refrigerator, i.e., at a temperature up to +8° C., typically at about +4° C.

The present invention also provides a dairy mousse containing about 2-20 w-% protein, about 3-20 w-% carbohydrates, about 0-8 w-% fat and about 20-232 kcal energy/100 g, and having casein:whey protein ratio between 20:80-65:35, pH in the range of 3.5-6.5 and an overrun of about 20-400%.

In a certain embodiment, the casein:whey protein ratio of the dairy mousse is in the range of 45:55-65:35. In one embodiment, the casein:whey protein ratio is 45:55. In another embodiment, the casein:whey protein ratio of the dairy mousse is 60:40. The dairy mousse of the present invention contains ideal whey proteins. In one embodiment, the proportion of whey protein of the total protein is 35-55 w-%. In one embodiment, the proportion of ideal whey protein of the total protein is 35-55 w-%.

In one embodiment, the product contains carbohydrates at most in the same amount as proteins. In one embodiment, the amount of proteins is at least equal to the amount of carbohydrates in the dairy mousse. In a certain embodiment, the proportion of the amount of proteins to the amount of carbohydrates is about 1:1. In another embodiment, the amount of proteins is higher than the amount of carbohydrates in the dairy mousse. In a certain embodiment, the proportion of the amount of proteins to the amount of carbohydrates is about 1:1 or more. In a certain embodiment, the proportion of the amount of proteins to the amount of carbohydrates is about 2:1.

In a certain embodiment, the pH of the dairy mousse of the present invention is in the range of 4.3-4.6. In a certain embodiment, the pH of the dairy mousse of the present invention is in the range of 4.3-4.5. In a certain embodiment, the pH of the dairy mousse of the present invention is in the range of 4.4-4.5.

In a certain embodiment, about 40% or more of the energy of the product comes from the proteins. In a certain embodiment, about 40% of the energy of the product comes from the proteins. In a certain embodiment, about 50% of the energy of the product comes from the proteins.

The overrun of the dairy mousse of the present invention is at least 20%. In one embodiment the overrun is about 20 about 400%. In another embodiment the overrun is about 20 about 120%. In another embodiment the overrun is about 120 about 300%. In one embodiment, the overrun is at least 45%. In one embodiment, the overrun is about 45 about 400%. In another embodiment, the overrun is about 45-about 300%. In a further embodiment, the overrun is about 45-about 120%. In an even further embodiment, the over-run is about 45-about 100%. In a certain embodiment the overrun is about 55-about 100%. In one embodiment, the overrun is about 45%-about 55%. In one embodiment, the overrun is about 100%. In one embodiment, the overrun is about 55%. In one embodiment, the overrun is about 45%. In one embodiment, the overrun is about 35%. In another embodiment, the overrun is at least 25%.

In one embodiment, the dairy mousse is produced according to the method of the present invention.

In a one embodiment, the dairy mousse according to the present invention comprises quark and a stabilizing agent.

In another embodiment, the dairy mousse according to the present invention comprises yogurt and a stabilizing agent.

In a certain embodiment, the dairy mousse according to the present invention comprises quark and yogurt and a stabilizing agent.

A further object of the invention relates to the use of ideal whey protein preparation and/or solution and/or protein modifying enzyme in the production of a dairy mousse.

It will be obvious to a person skilled in the art that, as the technology advances, the inventive concept can be implemented in various ways. The invention and its embodiments are not limited to the examples described above but may vary within the scope of the claims.

EXAMPLES

Example 1

Preparation of an Ideal Whey Protein Solution

Skimmed milk was microfiltered with polymeric microfiltration membranes of 800 kDa (Synder FR-3A-6338) at 10° C. The microfiltration was performed with a concentration factor of 16.5 to provide an ideal casein solution as a microfiltrate retentate. The ideal casein solution contains immunoglobulins and lactoferrin. It contains only very small amounts of α-lactalbumin (less than 0.05%) and β-lactoglobulin (less than 0.2%). The protein content of the ideal casein solution was 9.5%.

The microfiltration permeate obtained from the microfiltration was concentrated by ultrafiltration with an ultrafiltration membrane of 10 kDa (Koch HFK-131 6438-VYT) and with a concentration factor of 36 at 10° C. to provide a ideal whey solution as an ultrafiltration retentate. The protein content of the ideal whey solution was 9.0%. β-casein content is about 20% based on total protein.

Example 2

Recipe and Nutritional Value of a Quark Mousse According to the Present Invention The mousse was prepared by treating the ideal whey protein solution with transglutaminase (166 nkat/g protein) and mixing the treated ideal whey protein solution with quark, cream, stabilizer (a mixture of gelatin, starch, guar gum and diphosphate) and jam. This provided a casein/whey protein ratio of 60/40. The pH was adjusted to pH 4.3-4.6 with citric acid. The cream used in the recipe was non-homogenized to ensure the best foaming properties. Dynamic heat treatment was carried out at 82° C. This assured the denaturation of right amount of whey proteins (75-95%) during heat treatment and thus, enhancement of foaming properties of whey protein. Pasteurization temperature together with the optimized recipe was shown to provide the best texture without graininess. The overrun was 53%.

About 40% of the energy of the product comes from protein, which means that the product meets the requirement for a "high protein" claim.

The ingredients and the nutritional content of the mousse are shown in Tables 1 and 2, respectively.

TABLE 1

| Ingredient | weight-% |
| --- | --- |
| Quark | 51.5 |
| Ideal whey | 35.0 |
| Cream | 4.0 |
| Stabilizer mixture | 1.5 |
| Jam | 8.0 |

TABLE 2

| Nutritional content | Per 100 g/example | Range g/100 g |
| --- | --- | --- |
| Protein | 8.9 | 2-20 |
| Carbohydrates | 7.9 | 3-20 |
| Fat | 1.8 | 0-8 |
| Energy | 81 kcal | 20-232 kcal |

Example 3

Properties of Foams Prepared from Ideal Whey Protein Concentrate and Cheese Whey Protein Concentrate The foaming properties of ideal whey protein and cheese whey protein concentrates (WPC) were compared at 9% concentration. Whey protein solutions were pasteurized (82° C., 5 min) and whipped. The overruns of the ideal whey protein and WPC were 400% and 226%, respectively. Additionally, the bubble size of the ideal whey protein foam was smaller and the taste was mild and pleasant compared to foam prepared from WPC. WPC foam disappeared already during 20 h storage, whereas foam prepared from ideal whey protein concentrate was still firm and no liquid separation was observed in 20 h.

Ideal whey protein concentrate does not contain caseinomacropeptides, like cheese whey protein concentrate (WPC), because it is prepared by micro- and ultrafiltration. Quark is also free of caseinomacropeptides due to the use of rennet in manufacturing process and separation of caseinomacropeptides to quark whey. Thus, quark mousse prepared from ideal whey protein concentrate will reach better stability compared to foam prepared from cheese whey protein concentrate.

Example 4

Transglutaminase-Stabilized Whey-Protein Particles

Ideal whey protein solutions (at concentrations of 2-7%) were heat-treated at 90° C. for 30 min. Before TG addition (10 or 100 nkat/g) and foaming, the pH of the solutions weas adjusted to pH 5. Foam was produced with the aid of shear in measuring cylinders (Heidolph Silent Crusher M head at 15 000 rpm for 2 min).

It was microscopically shown that in the presence of TG the trend of bubble size were towards smaller bubbles. The larger number of small bubbles was observed in the foam treated with TG as compared with the foam with no TG treatment. The larger number of small bubbles was observed also in the foam treated with higher TG amount as compared with the foam with low TG treatment.

Without TG treatment, whey protein solution (heated at 90° C., 30 min at 2% concentration) did not form a viscoelastic film at the bulk concentration of 0.001%. TG-treated whey protein solution at the same conditions, however, showed a gradually increasing elastic modulus (G') forming a weak but viscoelastic film.

When the concentration of the whey protein solution was increased 10 folds, both samples showed higher G' values compared to lower concentration and similarly, TG-pretreated whey protein solution resulted in gradually increasing G' while non-treated sample stabilized at a lower value. The results are shown in FIG. 1.

Example 5

Effect of Transglutaminase on Whey Protein Foam Stability

Figure 2:
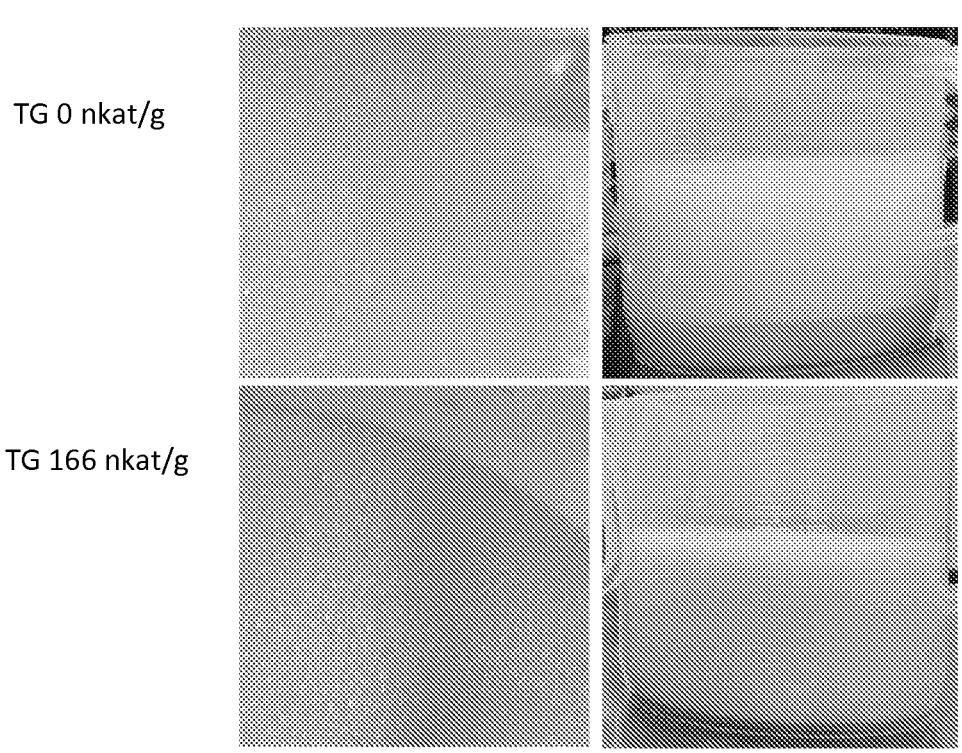
FIG. 2 shows the structure and stability of ideal whey protein foam (with and without TG) after 20 h storage.

Ideal whey protein solution (at concentration of 9%) was treated with transglutaminase (166 nkat/g) for 18 h at 5° C., after which the solutions were pasteurized (78° C., 2 min) and whipped. An ideal whey protein solution without transglutaminase treatment was also prepared. Transglutaminase treatment had hardly any effect on foam overrun, i.e. the overruns of the samples were at the same level as shown in FIG. 2. Transglutaminase was, however, shown to improve the quality of foam. For example, the amount of separated liquid was approximately 90% without TG, but with TG the foam was still firm and no liquid separation was observed in 20 h storage. The bubble size of the foam was smaller and the stability of the foam was improved, i.e. no coalescence was observed even in one week storage. Additionally, the mouth feel of the TG-treated product was better and the foam was firmer.

Example 6

Effect of Transglutaminase on Properties of Dairy Mousse

Ideal whey protein solution (at concentration of 9%) was first treated with transglutaminase (166 nkat/g) for 18 h at 5°

C. An ideal whey protein solution without transglutaminase treatment was also prepared. The whey protein solutions were then mixed (1:1) with yogurt having protein content of 4.1% and fat content of 2.5% and pH of the mixtures were adjusted to pH 4.4-4.5. The whey protein-yogurt mixtures were then pasteurized (82° C., 2 min) and whipped. Transglutaminase treatment was shown to improve the quality of foam. The bubble size of the foam was smaller and the stability of the foam was improved. For example, amount of separated liquid were 50% without TG, but with the TG dosage of 166 nkat/g, the amount was decreased 60%.

Example 7

The ideal whey protein solution (at concentration of 9%) was first treated with transglutaminase (330 nkat/g) for 18 h at 5° C. An ideal whey protein solution without transglutaminase treatment was also prepared. The whey protein solutions were then mixed with quark, cream and jam. The pH of the mixtures were adjusted between pH 4.3-4.5 with citric acid, pasteurized (82° C., 2 min) and whipped. The transglutaminase treatment improved the stability of mixtures, i.e. amount of separated liquid (whey) was decreased by the transglutaminase treatment.

Example 8

Ideal whey protein solution (at concentration of 9%) was first treated with transglutaminase (166 nkat/g) for 18 h at 5° C. An ideal whey protein solution without transglutaminase treatment was also prepared. The whey protein solutions were mixed with yogurt, cream, stabilizer, and jam. The pH of the mixtures were adjusted between pH 4.3-4.5 with citric acid and pasteurized (82° C., 2 min) and whipped. Transglutaminase treatment had hardly any effect on foam overrun, i.e. the overruns of the samples were at the same level. TG was, however, shown to improve the quality of foam. The bubble size of the foam was smaller, and thus the mouth feel of the TG-treated mousse was firmer and better and it was sensed colder in mouth.

Example 9

Figure 3:
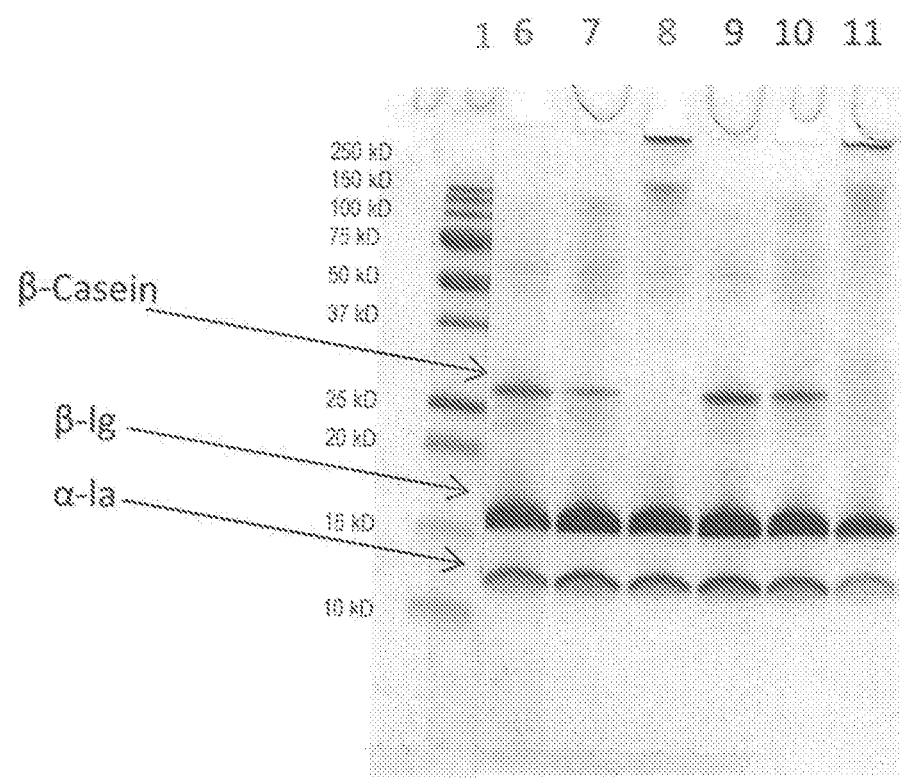
FIG. 3 shows the SDS-Page gel showing the effect of heat treatment (80° C., 2 min) on the activity of transglutaminase on ideal whey protein solution.

Effect of Heat Treatment on the Activity of Transglutaminase on Ideal Whey Protein Solution The effect of heat treatment (80° C., 2 min) on the activity of transglutaminase on ideal whey protein solution (at concentration of 9%) was studied. Ideal whey protein solutions (lines 6, 7 and 8) were treated with transglutaminase 0 U/g, 1 U/g and 10 U/g, respectively, for 18 h at 5° C. In addition, Ideal whey protein solutions (lines 9, 10 and 11) were first heat-treated 80° C., 2 min, and then treated with transglutaminase 0 U/g, 1 U/g and 10 U/g, respectively, for 18 h at 5° C. It was surprisingly found that transglutaminase was active also without the heat-treatment, i.e., the heat-treatment did not affect the activity of transglutaminase. The results (SDS-Page gel) are shown in FIG. 3. Line 1 is a standard.

Example 10

Recipe and Nutritional Value of a Quark Mousse According to the Present Invention The mousse was prepared using the method disclosed in Example 2.

The ingredients and the nutritional content of the mousse are shown in Tables 3 and 4, respectively.

TABLE 3

| Ingredient | weight-% |
|---|---|
| Quark | 53.2 |
| Ideal whey | 35.0 |
| Cream | 4.0 |
| Stabilizer mixture | 1.6 |
| Jam | 6.0 |

TABLE 4

| Nutritional content | Per 100 g/example |
|---|---|
| Protein | 9.4 |
| Carbohydrates | 4.7 |
| Fat | 1.8 |
| Energy | 72 kcal |

About 50% of the energy of the product comes from protein, which means that the product meets the requirement for a "high protein" claim. The overrun was 100%.

The invention claimed is:

1. A method for preparing a dairy mousse comprising the steps of:
   providing a milk raw material,
   subjecting the milk raw material to microfiltration to provide an ideal whey protein solution as a microfiltration permeate containing the whey proteins in native forms and free from by-products from the cheese manufacture,
   crosslinking proteins of the ideal whey protein solution with 10-330 nkat/g protein of transglutaminase to obtain a protein crosslinked solution,
   optionally mixing the protein crosslinked solution with an acidified dairy product and/or food product to provide a mixture,
   optionally adding a stabilizing agent to the protein crosslinked solution or the mixture,
   adjusting the pH to the range of 3.5-6.5,
   heat-treating the protein crosslinked solution or the mixture, and
   subjecting the protein crosslinked solution or the mixture to an aeration treatment for providing an aerated dairy product.

2. The method according to claim 1, wherein the method comprises the step of adding a stabilizing agent to the transglutaminase-treated solution or the mixture.

3. The method according to claim 1, wherein the pH is adjusted to the range of 4.3-4.6.

4. The method according to claim 1, wherein the aeration treatment is performed by whipping with an ice cream freezer, utilizing HPP-technique or an utilizing ultrasound or cavitation technique.

5. A method using an ideal whey protein solution, which is a microfiltration permeate obtained from microfiltration of a milk raw material, the method comprising the steps of
   providing a milk raw material,
   subjecting the milk raw material to microfiltration to provide the ideal whey protein solution as a microfiltration permeate containing the whey proteins in their native form and free from by-products from the cheese manufacture, crosslinking proteins of the ideal whey protein solution with 10-330 nkat/g protein of transglutaminase to obtain a protein crosslinked solution, and subjecting the protein crosslinked solution to an aeration treatment for providing an aerated dairy product.

6. The method according to claim 1, wherein the ideal whey protein solution does not contain caseinomacropeptides.

7. The method according to claim 5, where the ideal whey protein solution does not contain caseinomacropeptides.

* * * * *